June 18, 1940.  J. G. McNALLY ET AL  2,204,608
SUBBING PHOTOGRAPHIC FILM
Filed Dec. 30, 1938

Inventors
James J. McNally
Russell H. Van Dyke
By
Newton M. Perrine
R. Frank Smith
Attorneys Patented June 18, 1940

2,204,608

UNITED STATES PATENT OFFICE 2,204,608

SUBBING PHOTOGRAPHIC FILM

James G. McNally and Russel H. Van Dyke, Rochester, N. Y., assignors to Eastman Kodak Company, Rochester, N. Y., a corporation of New Jersey Application December 30, 1938, Serial No. 248,497

12 Claims. (Cl. 95—9)

This invention relates to photographic materials and more particularly to the subbing of photographic film.

In the manufacture of photographic safety film in which the film base is formed of a substantially non-inflammable derivative of cellulose, such as cellulose acetate, the manner of securing the proper adhesion of the various layers to the film base constitutes a serious problem. The degree of adhesion of the layers to the base must be neither too great, in which case the resulting film is brittle, nor too slight, in which case the layers of the film strip or peel from the support. Various means have been proposed for overcoming these difficulties and among these is the use of synthetic resins as substrata to be coated between the support and the emulsion layer of the film. One objection to the use of synthetic resins as substrata has been their thermoplasticity and solvent retention properties. Many of these resins are subject to melting or softening when the temperature surrounding them is increased above normal and some of them also possess the property of retaining unusually large amounts of solvent.

It is, therefore, an object of the present invention to provide a method for subbing photographic film which results in a film having satisfactory brittleness and stripping properties. A further object is to provide a substratum which is not highly thermoplastic. A still further object is to provide a substratum which does not retain large amounts of solvent in the finished film. Other objects will appear from the following description of our invention.

These objects are accomplished by coating a photographic film support, preferably a cellulose organic acid ester support, with a resinous ester of the lactone of a heteropolymer of vinyl alcohol and an unsaturated $\alpha,\beta$-dicarboxylic acid. The resins which we propose to use and a method of preparing them are described in our copending application Serial No. 248,496, filed December 30, 1938.

In the accompanying drawing, we have shown in enlarged sectional views a number of modifications of photographic film made according to our invention. In the drawing.

The application of the various layers to the film base may be carried out in any manner well known to those skilled in the art. The film support may be any of the customary cellulose organic derivative compositions such as cellulose acetate, cellulose acetate propionate, cellulose acetate butyrate, cellulose ethers, etc. Cellulose nitrate may also be used as the support material but there is usually little difficulty in subbing a support of this type and the invention is particularly designed for use with cellulose organic derivative supports. The support is coated with a solution of one of the resins used according to our invention and after this coating has dried it is followed by the next layer to be used in the film. A gelatin layer applied from suitable solvents may be coated over the resin or it may first be coated with a protective sub of cellulose nitrate or hydrolyzed cellulose acetate followed by the gelatin layer. The sensitive emulsion layer is coated over the gelatin layer.

The resins used as subs according to our invention consist of esters of the lactone of a heteropolymer of a vinyl compound and an unsaturated $\alpha,\beta$-dicarboxylic acid. The vinyl compound may consist of vinyl alcohol or a vinyl ester such as vinyl acetate, vinyl propionate or vinyl benzoate. The dicarboxylic acid may be maleic acid, itaconic acid or the anhydride of one of these acids. These resins are prepared, as described in our copending application Serial No. 248,496, filed December 30, 1938, by deesterifying with an alcohol, acyl groups from a heteropolymer of a vinyl organic acid ester and an unsaturated $\alpha,\beta$-dicarboxylic acid or its anhydride, and esterifying with an alcohol the acid or anhydride groups in the heteroplymer, and forming a lactone from the resulting product. By esterifying with an alcohol, an ester of the lactone is produced. The resins are most readily prepared from primary monohydric alcohols, especially those containing at least four carbon atoms. Alcohols such as methyl, ethyl, propyl, butyl and amyl may be used.

The resins produced in this way possess properties entirely different from similar prior resins and are especially adaptable to subbing photographic film. These resins are not water soluble nor highly thermoplastic and are less brittle than similar compounds hitherto known.

Our invention will now be described by reference to the accompanying drawing.

Figure 1:
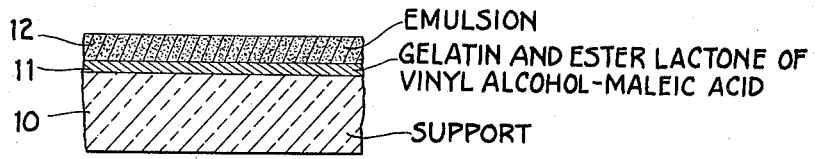
Fig. 1 is a sectional view of a film base in which a mixture of gelatin and the resin used according to our invention is coated between the support and the emulsion.

Fig. 1 is a sectional view of a film in which the support 10 is directly coated with a mixture of gelatin and a resinous ester of the lactone of the heteropolymer of vinyl alcohol and maleic acid. The subbing layer formed in this way is then coated with the emulsion layer 12.

Figure 2:
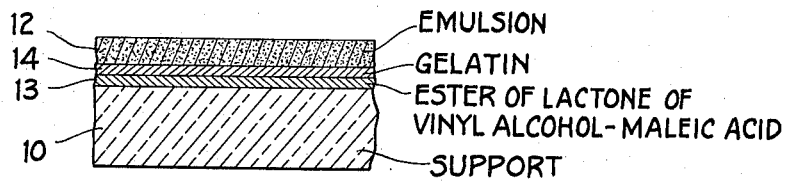
Fig. 2 is a sectional view of a film in which a layer of the resin alone is coated directly on the support and a separate layer of gelatin is coated over it.
Figure 3:
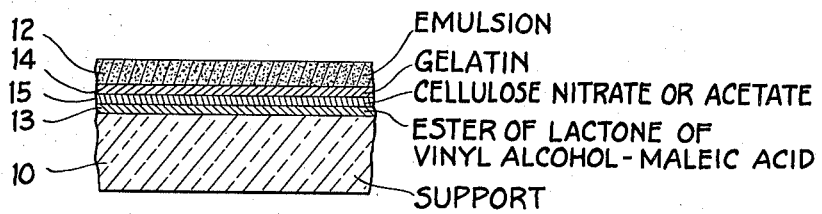
Fig. 3 is a sectional view of a similar film in which a layer of cellulose nitrate or cellulose acetate is coated between the resin and the gelatin layers.

In the modification shown in Fig. 2 the support 10 is coated with a layer 13 of the resinous ester of the lactone of the heteropolymer of vinyl alcohol and maleic acid and this layer is followed by a separate gelatin layer 14 and emulsion layer 12. A similar film is illustrated in Fig. 3 in which the support 10 is coated with a layer 13 of a resinous ester of the lactone of the heteropolymer of vinyl alcohol and maleic acid. The resin sub layer 13 is coated with a protective layer 15 of cellulose nitrate or hydrolyzed cellulose acetate which is a very thin layer designed to protect the resin layer during coating of the subsequent layers. The gelatin layer 14 and emulsion layer 12 are coated on the cellulose ester layer 15.

The following examples will illustrate the manner in which a film base may be coated according to our invention:

Example 1

A film base of cellulose acetate was coated with a single subbing layer composed of a mixture of gelatin and the butyl ester of the lactone of the heteropolymer of vinyl acetate and maleic acid. The subbing solution used had the following composition:

|  | Per cent |
|---|---|
| Gelatin | 1 |
| Acetic acid | 2 |
| Resin | 0.5 |
| Water | 4 |
| Acetone | 84.5 |
| Methanol | 8 |

After this subbing layer had dried, the usual emulsion layer was coated directly on it. The film produced in this way was found to be free from objectionable stripping and brittleness and the substratum was not highly thermoplastic nor did it retain a large amount of solvent after drying.

Example 2

A film base of cellulose acetate propionate was coated with the following solution of the propyl ester of the lactone of the heteropolymer of vinyl acetate and maleic acid:

|  | Per cent |
|---|---|
| Resin | 3 |
| Acetone | 97 |

The resin layer was followed with a gelatin sub consisting of a 1% gelatin solution in a mixture of 70% acetone and 30% methanol. The usual emulsion layer was coated on this gelatin layer.

Example 3

A film base of cellulose acetate was coated with the following solution of the butyl esters of the lactone of the heteropolymer of vinyl acetate and maleic anhydride.

|  | Per cent |
|---|---|
| Resin | 3 |
| Acetone | 97 |

After drying, this undercoat was followed by a coating of a 2½% solution in methyl alcohol of a low viscosity cellulose nitrate. The cellulose nitrate used was one which had a methyl alcohol solubility of 30–100% of viscosity of 2–5 seconds by the Dropping Ball method and a nitrogen content of about 11%. This layer was followed by the usual gelatin subbing layer having approximately the following composition:

|  | Per cent |
|---|---|
| Gelatin | 1 |
| Acetic acid | 0.5 |
| Water | 10 |
| Methanol | 88.5 |

The usual sensitive emulsion layer was coated over this gelatin subbing layer.

The photographic film produced according to our invention was found to be thoroughly satisfactory and to meet the customary requirements. It was not subject to stripping and was sufficiently flexible to meet the customary requirements of commercial photographic film. In addition to the advantages mentioned above, the use of the resins according to our invention as subbing layers permits curing the film at higher than usual temperatures. Since the resins used are not thermoplastic to any extent higher temperatures may be used in curing them and the length of time required for curing thereby reduced. In certain cases as indicated in the above description of our invention the number of subbing layers may be reduced by the use of the particular resins proposed.

The examples and modifications described in the present specification are illustrative only and it is to be understood that numerous changes can be made in our invention within the scope of the appended claims.

We claim:

1. A flexible photographic film free from brittleness, comprising a cellulose organic derivative support and an emulsion layer, and between said support and said emulsion layer, a subbing layer of a resinous ester of the lactone of a heteropolymer of a vinyl compound and an unsaturated $\alpha,\beta$-dicarboxylic acid.

2. A flexible photographic film free from brittleness, comprising a cellulose organic derivative support and an emulsion layer, and between said support and said emulsion layer, a subbing layer of a resinous ester of the lactone of a heteropolymer of vinyl alcohol and maleic acid.

3. A flexible photographic film free from brittleness, comprising a cellulose organic derivative support and an emulsion layer, and between said support and said emulsion layer, a subbing layer of a resinous butyl ester of the lactone of a heteropolymer of vinyl alcohol and an unsaturated $\alpha,\beta$-dicarboxylic acid.

4. A flexible photographic film free from brittleness, comprising a cellulose organic derivative support and an emulsion layer, and between said support and said emulsion layer, a subbing layer of a resinous ester of the lactone of a heteropolymer of vinyl acetate and an unsaturated $\alpha,\beta$-dicarboxylic acid.

5. A flexible photographic film free from brittleness, comprising a cellulose organic derivative support and an emulsion layer, and between said support and said emulsion layer, a subbing layer of a resinous ester comprising the lactone produced from a primary butyl alcohol and a heteropolymer of vinyl acetate and maleic anhydride.

6. A flexible photographic film free from brittleness, comprising a cellulose organic derivative support and an emulsion layer, and between said upport and said emulsion layer, a subbing layer of a resinous ester comprising the lactone produced from a primary butyl alcohol and a heteropolymer of vinyl acetate and maleic anhydride, and gelatin.

7. A flexible photographic film free from brittleness, comprising a cellulose organic derivative upport, and in order thereon, a subbing layer of a resinous ester of the lactone of a heteropolymer of vinyl alcohol and an unsaturated $\alpha,\beta$-dicarboxylic acid, a gelatin layer, and an emulsion layer.

8. A flexible photographic film free from brittleness, comprising a cellulose organic derivative upport, and in order thereon, a subbing layer of a resinous ester of the lactone of a heteropolymer of vinyl alcohol and maleic acid, a gelatin layer, and an emulsion layer.

9. A flexible photographic film free from brittleness, comprising a cellulose organic derivative upport, and in order thereon, a subbing layer of a resinous butyl ester of the lactone of a heteropolymer of vinyl alcohol and maleic acid, a gelatin layer, and an emulsion layer.

10. A flexible photographic film free from brittleness, comprising a cellulose organic derivative support, and in order thereon, a subbing layer of a resinous ester of the lactone of a heteropolymer of vinyl alcohol and an unsaturated $\alpha,\beta$-dicarboxylic acid, a thin cellulose ester layer, a gelatin layer, and an emulsion layer.

11. A flexible photographic film free from brittleness, comprising a cellulose organic derivative support, and in order thereon, a subbing layer of a resinous ester of the lactone of a heteropolymer of vinyl alcohol and maleic acid, a thin cellulose ester layer, a gelatin layer, and an emulsion layer.

12. A flexible photographic film free from brittleness, comprising a cellulose organic derivative support, and in order thereon, a subbing layer of a resinous butyl ester of the lactone of a heteropolymer of vinyl alcohol and maleic acid, a thin cellulose ester layer, a gelatin layer, and an emulsion layer.

JAMES G. McNALLY.
RUSSEL H. VAN DYKE.